United States Patent
McBride et al.

(10) Patent No.: US 12,177,109 B2
(45) Date of Patent: Dec. 24, 2024

(54) BLOCKCHAIN ENHANCED ROUTE AUTHORIZATION

(71) Applicant: Huawei Technologies Co., Ltd., Shenzhen (CN)

(72) Inventors: Michael McBride, Plano, TX (US); Yingzhen Qu, Plano, TX (US); Linda Dunbar, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/981,574

(22) Filed: Nov. 7, 2022

(65) Prior Publication Data

US 2023/0059348 A1 Feb. 23, 2023

Related U.S. Application Data

(63) Continuation of application No. PCT/US2021/023232, filed on Mar. 19, 2021.
(Continued)

(51) Int. Cl.
*H04L 45/02* (2022.01)
*H04L 9/08* (2006.01)
(Continued)

(52) U.S. Cl.
CPC ............ *H04L 45/02* (2013.01); *H04L 9/0825* (2013.01); *H04L 9/3247* (2013.01); *H04L 45/748* (2013.01)

(58) Field of Classification Search
CPC ... H04L 9/0891; H04L 9/3066; H04L 9/3239; H04L 45/04; H04L 45/748;
(Continued)

(56) References Cited

U.S. PATENT DOCUMENTS 8,451,750 B2 * 5/2013 Ward .................. H04L 45/04
370/254
9,804,891 B1 * 10/2017 Adalier ................ H04L 9/3066
(Continued)

OTHER PUBLICATIONS

Lepinski, M., et al., "A Profile for Route Origin Authorizations (ROAs)," RFC 6482, Feb. 2012, 9 pages.
(Continued)

*Primary Examiner* — Dustin Nguyen
(74) *Attorney, Agent, or Firm* — Conley Rose, P.C

(57) ABSTRACT

A routing device including a memory and a processor. The memory stores instructions. The processor is configured to execute the instructions to receive a signed route origin authorization (ROA), which includes a blockchain hash, and a border gateway protocol (BGP) update message, which includes one or more routes. The processor is further configured to implement a Route Origin Validation (ROV) process using the blockchain hash in the signed ROA to determine whether the one or more routes in the BGP update message are valid; update a routing table to include the one or more routes from the BGP update message when the one or more routes are determined to be valid by the ROV process; and refrain from updating the routing table with the one or more routes from the BGP update message when the one or more routes are determined to be invalid by the ROV process.

20 Claims, 7 Drawing Sheets

Related U.S. Application Data

(60) Provisional application No. 63/040,910, filed on Jun. 18, 2020.

(51) Int. Cl.
  *H04L 9/32* (2006.01)
  *H04L 45/748* (2022.01)

(58) Field of Classification Search
  CPC . H04L 61/5007; H04L 61/5061; H04L 63/12; H04L 63/029; H04L 45/566; H04L 41/12; H04L 63/0236; H04L 67/10; G06Q 20/223
  See application file for complete search history.

(56) References Cited

U.S. PATENT DOCUMENTS

| | | | |
|---|---|---|---|
| 10,893,022 B1* | 1/2021 | Li | H04L 45/748 |
| 11,394,641 B1* | 7/2022 | Massaguer | H04L 45/566 |
| 2015/0207728 A1* | 7/2015 | Gagliano | H04L 41/12 |
| | | | 370/254 |
| 2015/0207818 A1* | 7/2015 | Gagliano | H04L 63/029 |
| | | | 726/1 |
| 2016/0226760 A1* | 8/2016 | Liljenstolpe | H04L 45/04 |
| 2017/0324738 A1* | 11/2017 | Hari | H04L 61/5007 |
| 2017/0353430 A1* | 12/2017 | Holtmanns | H04L 63/12 |
| 2017/0374174 A1* | 12/2017 | Evens | H04L 67/10 |
| 2019/0372886 A1 | 12/2019 | Beck | |
| 2021/0067377 A1* | 3/2021 | Beck | H04L 9/0891 |
| 2021/0105250 A1* | 4/2021 | Grinius | H04L 61/5061 |
| 2021/0105297 A1* | 4/2021 | Beck | H04L 63/0236 |
| 2021/0158346 A1* | 5/2021 | Liu | G06Q 20/223 |
| 2021/0160067 A1* | 5/2021 | Liu | H04L 9/3239 |
| 2021/0306256 A1* | 9/2021 | Ward | H04L 45/04 |
| 2022/0337508 A1* | 10/2022 | Wang | H04L 45/04 |

OTHER PUBLICATIONS

Saad, M., et al., "RouteChain: Towards Blockchain-based Secure and Efficient BGP Routing," 2019 IEEE International Conference on Blockchain and Cryptocurrency (ICBC), XP033571938, May 14, 2019, 4 pages.

Haseeb, K., et al., "Intrusion Prevention Framework for Secure Routing in WSN-based Mobile Internet of Things," IEEE Access, vol. 7, XP011763835, Dec. 30, 2019, 12 pages.

* cited by examiner

BLOCKCHAIN ENHANCED ROUTE AUTHORIZATION

CROSS-REFERENCE TO RELATED APPLICATIONS

This patent application is a continuation of International Application No. PCT/US2021/023232 filed on Mar. 19, 2021, by Futurewei Technologies, Inc., and titled "Blockchain Enhanced Route Authorization," which claims the benefit of U.S. Provisional Patent Application No. 63/040,910 filed Jun. 18, 2020 by Futurewei Technologies, Inc., and titled "Blockchain Enhanced Route Origin Authorization," each of which is hereby incorporated by reference.

TECHNICAL FIELD

The present disclosure is generally related to route origin authorization (ROA), and is specifically related to a blockchain enhanced ROA.

BACKGROUND

Internet Service Providers (ISPs) and other types of Internet connected networks continually face the threat of Border Gateway Protocol (BGP) attacks. In a BGP attack, a malicious attacker causes Internet traffic to be misrouted and/or mishandled by manipulating BGP routing data. The misrouting and/or mishandling of Internet traffic due to BGP hijacks represents a significant security threat to ISPs and other Internet connected networks, as well as Internet users, as traffic can be forwarded through malicious computing devices and is often not forwarded to its intended destination at all.

SUMMARY

The disclosed aspects/embodiments provide techniques that enhance an ROA by adding a blockchain hash. Because of the blockchain hash, the security or integrity of the ROA is improved relative to current ROAs being used in the RPKI system. As such, a malicious attacker is prevented from implementing a successful BGP attack and unable to improperly divert packet traffic in an IP network. Thus, routing devices implementing the blockchain enhanced route authorization disclosed herein are able to offer enhanced security for the data and information being routed through a telecommunication network relative to current routing devices only utilizing known ROA techniques.

A first aspect relates to a routing device, comprising: a memory storing instructions; and a processor coupled to the memory, the processor configured to execute the instructions to cause the routing device to: receive a signed route origin authorization (ROA), the signed ROA including a blockchain hash; receive a border gateway protocol (BGP) update message, the BGP update message including one or more routes; implement a Route Origin Validation (ROV) process using the blockchain hash in the signed ROA to determine whether the one or more routes in the BGP update message are valid; update a routing table to include the one or more routes from the BGP update message when the one or more routes are determined to be valid by the ROV process; and refrain from updating the routing table with the one or more routes from the BGP update message when the one or more routes are determined to be invalid by the ROV process.

Optionally, in any of the preceding aspects, another implementation of the aspect provides that the blockchain hash is disposed in a blockchain field of the signed ROA.

Optionally, in any of the preceding aspects, another implementation of the aspect provides that the blockchain hash includes a route prefix record.

Optionally, in any of the preceding aspects, another implementation of the aspect provides that the signed ROA is received from a server of an Internet Service Provider (ISP).

Optionally, in any of the preceding aspects, another implementation of the aspect provides that the BGP update message is received from another routing device.

Optionally, in any of the preceding aspects, another implementation of the aspect provides that the signed ROA received by the routing device was generated by a regional Internet registry (RIR).

Optionally, in any of the preceding aspects, another implementation of the aspect provides that the ROV process is implemented using Resource Public Key Infrastructure (RPKI) software stored in the memory of the routing device.

Optionally, in any of the preceding aspects, another implementation of the aspect provides that the routing device further comprises a transmitter configured to route a packet according the routing table.

A second aspect relates to a method of validating routing tables implemented by a routing device, comprising: receiving a signed route origin authorization (ROA), the signed ROA including a blockchain hash; receiving a border gateway protocol (BGP) update message, the BGP update message including one or more routes; updating a routing table to include the one or more routes from the BGP update message when the one or more routes are determined to be valid by the Route Origin Validation (ROV) process; and refraining from updating the routing table with the one or more routes from the BGP update message when the one or more routes are determined to be invalid by the ROV process.

Optionally, in any of the preceding aspects, another implementation of the aspect provides that the blockchain hash is disposed in a blockchain field of the signed ROA.

Optionally, in any of the preceding aspects, another implementation of the aspect provides that the blockchain hash includes a route prefix record.

Optionally, in any of the preceding aspects, another implementation of the aspect provides receiving the signed ROA from a server of an Internet Service Provider (ISP).

Optionally, in any of the preceding aspects, another implementation of the aspect provides receiving the BGP update message from another routing device.

Optionally, in any of the preceding aspects, another implementation of the aspect provides implementing the ROV process using Resource Public Key Infrastructure (RPKI) software stored in a memory of the routing device.

Optionally, in any of the preceding aspects, another implementation of the aspect provides receiving a packet from a second routing device and routing the packet to a third routing device according to the routing table.

A third aspect relates to a computer program product comprising instructions stored on a non-transitory computer-readable medium that, when executed by a processor, cause a routing device to: implement a Route Origin Validation (ROV) process using a blockchain hash obtained from a signed route origin authorization (ROA) to determine whether one or more routes in a border gateway protocol (BGP) update message are valid; update a routing table to include the one or more routes from the BGP update message when the one or more routes are determined to be valid by the ROV process; and refrain from updating the routing table with the one or more routes from the BGP update message when the one or more routes are determined to be invalid by the ROV process.

Optionally, in any of the preceding aspects, another implementation of the aspect provides that the ROV process is implemented in response to receiving the signed ROA including the blockchain hash, and receiving the BGP update message including one or more routes.

Optionally, in any of the preceding aspects, another implementation of the aspect provides that the signed ROA is received from a server of an Internet Service Provider (ISP).

Optionally, in any of the preceding aspects, another implementation of the aspect provides that the BGP update message is received from another routing device.

Optionally, in any of the preceding aspects, another implementation of the aspect provides that the ROV process is implemented using Resource Public Key Infrastructure (RPKI) software stored on the non-transitory computer-readable medium.

A fourth aspect relates to a validation system, comprising: a routing device as in any of the disclosed embodiments; a server of an Internet Service Provider (ISP) in communication with the routing device; the server of the ISP configured to provide a signed route origin authorization (ROA) to the routing device; and a server of a regional Internet registry (RIR), the server of the ISP configured to provide the signed ROA to the server of the ISP.

A fifth aspect relates to a routing device, comprising: memory means storing instructions; and processing means coupled to the memory means, the processing means configured to execute the instructions to cause the routing device to: receive a signed route origin authorization (ROA), the signed ROA including a blockchain hash; receive a border gateway protocol (BGP) update message, the BGP update message including one or more routes; implement a Route Origin Validation (ROV) process using the blockchain hash in the signed ROA to determine whether the one or more routes in the BGP update message are valid; update a routing table to include the one or more routes from the BGP update message when the one or more routes are determined to be valid by the ROV process; and refrain from updating the routing table with the one or more routes from the BGP update message when the one or more routes are determined to be invalid by the ROV process.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An autonomous system (AS) is a very large network or group of networks with a single routing policy. Border Gateway Protocol (BGP) is a standardized exterior gateway protocol designed to exchange routing and reachability information between autonomous systems on the Internet.

An AS may be assigned a range of Internet Protocol (IP) addresses (a.k.a., a netblock). Using a BGP update message, an AS may advertise or announce that the netblock is reachable. The BGP update message provides a route prefix that specifies a route to the AS. The route prefix includes an IP address prefix and a length of the IP address prefix in bits. For example, an AS assigned the netblock "24.158.32.0" may cause traffic to be routed to the AS by sending a BGP update message from its routers (e.g., peer routers, edge routers, etc.) announcing a route with the route prefix "24.158.32.0/19". The route prefix "24.158.32.0/19" indicates that the IP address prefix of the netblock is "24.158.32.0" and that the IP address prefixes are 19 bits long. The route prefix may be referred to herein as a route prefix record.

In BGP, a path length refers to a number of ASs that a packet has to travel through to reach the AS corresponding to the packet's destination. Each AS, or hop, corresponds to a unique AS number (ASN). Thus, in BGP a path length may be determined by counting the number of unique ASNs in a BGP update advertising a path.

As BGP messages that advertise paths are received by routers, the paths and their attributes may be stored in routing tables for use in routing packets along those paths. In response to receiving a packet addressed to a route prefix, a router may determine the available paths to the route prefix stored in its routing table. The router may determine the path lengths for each available path and may select the route with the shortest path length as the path to use for routing the packet. When the router identifies a tie between shortest path lengths, additional criteria beyond path length may be used to break the tie and select the path to use for routing the packet.

Figure 1:
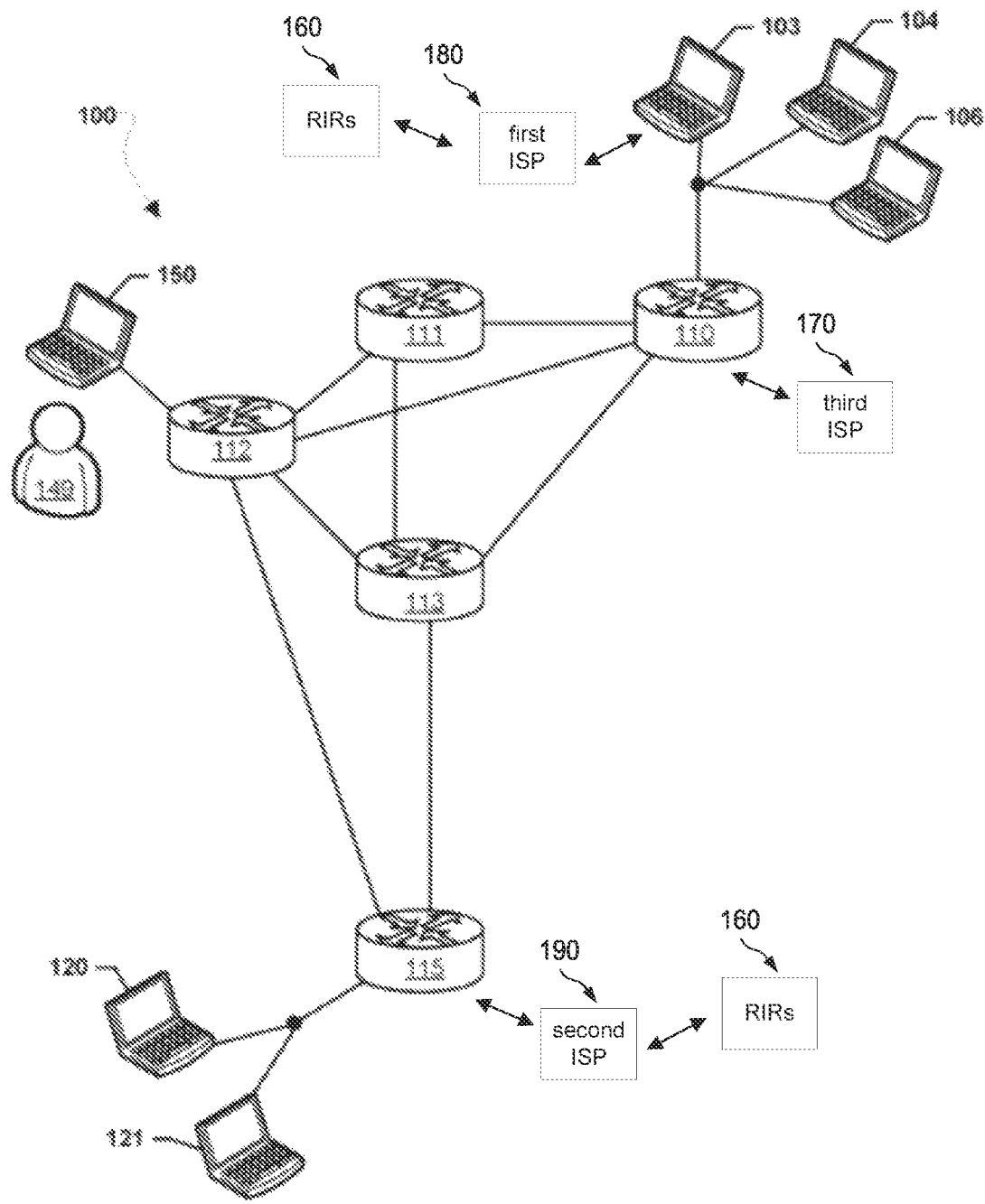
FIG. 1 is an Internet Protocol (IP) network configured to use BGP for routing packets.

FIG. 1 is an IP network 100 configured to use BGP for routing packets. The IP network 100 may include multiple devices, such as routers 110, 111, 112, 113, 115, and computing devices 103, 104, 106, 120, 121, 150. While each router 110, 111, 112, 113, 115 is illustrated in FIG. 1 as a single device, each router 110, 111, 112, 113, 115 may represent a plurality of routers in practical applications. The routers 110, 111, 112, 113, 115 and computing devices 103, 104, 106, 120, 121, 150 or the network 100 may exchange data with one another according to IP protocols via their various connections with one another. Collectively, the connections between the routers 110, 111, 112, 113, 115 may represent the Internet and the data routed between the routers 110, 111, 112, 113, 115 may be Internet traffic. The connections may be wired, wireless, or a combination thereof. The routers 110, 111, 112, 113, 115 may exchange routing information with one another according to BGP. Each router 110, 111, 112, 113, 115 may be assigned its own unique ASN to distinguish one router from another router.

By way of example, router 110 of a first AS operated by a first ISP 180 may be in communication with, and provide services to, computing devices 103, 104, 106. Router 115 of a second AS operated by a second ISP 190 may be in communication with, and provide services to, computing devices 120, 121. A range of IP addresses (a.k.a., a netblock) may be assigned to each AS (e.g., on a per ASN basis), and the respective computing devices of that entity may be assigned IP addresses within that netblock. Each netblock may have a different route prefix. For example, computing devices 103, 104, 106 connected to the router 110 may have IP addresses within that first AS's netblock identified by a first route prefix. In contrast, computing devices 121, 121 connected to router 115 may have IP addresses with the second AS's netblock identified by a second route prefix. As the first route prefix of the first netblock may identify that the netblock is associated with the router 110, Internet traffic destined for IP addresses in the first netblock may be routed to router 110 by the other routers 111, 112, 113, 115. Similarly, as the second route prefix of the second netblock may identify that the netblock is associated with the router 115, Internet traffic destined for IP addresses in the second netblock may be routed to router 115 by the other routers 110, 111, 112, 113.

The various routers 110, 111, 112, 113, 115 may exchange BGP messages with one another to create, update, and withdraw routing paths among one another in their respective routing tables. As BGP events occur, BGP log messages, such as BGP messages reflecting BGP updates, BGP withdraws, etc., may be generated and sent from the routers 110, 111, 112, 113, 115.

During normal operation, routing of Internet traffic among the routers 110, 111, 112, 113, 115 may occur according to the BGP routing information advertised by the respective ASs operating those routers 110, 111, 112, 113, 115. For example, a third ISP 170 operating router 110 may be assigned the netblock "24.158.32.0" and may cause traffic to be routed to router 110 by sending a BGP update announcing a route with the route prefix "24.158.32.0/19". Routers 111, 112, 113, and 115 may then update their routing tables to route Internet traffic for the netblock "24.158.32.0" to router 110 according to the BGP update and Internet traffic destined for computing device 103, 104, 106 with IP addresses in the netblock "24.158.32.0" may flow to router 110 for routing to those computing devices.

In a BGP attack, a malicious attacker 149 may use his or her computing device 150 to corrupt an AS, e.g., through router 112, to hijack netblocks that are not assigned to the malicious attacker 149. The computing device 150 of the malicious attacker 149 may cause Internet traffic to be misrouted by announcing a malicious route to which the malicious attacker 149 is not actually assigned. Continuing with the preceding example of router 110 being associated with netblock "24.158.32.0", router 110 may normally announce its routes with a routing prefix of "24.158.32.0/19". To hijack Internet traffic intended for the netblock "24.158.32.0" through router 110, the computing device 150 of the malicious attacker 149 may announce a malicious route with the routing prefix "24.158.32.0/19" at router 112. The announcement of the malicious route may be propagated between routers 111, 112, 113, 115 according to BGP and the malicious route may be used to route Internet traffic by any impacted router for which the AS path length to router 112 is shorter than the AS path length to router 110.

In this manner, the malicious attacker 149 may hijack a portion of the Internet traffic intended for computing devices 103, 104, and 106. Because the malicious route will be used for routing Internet traffic when the path length is shorter to router 112, rather than the intended route by the entity actually assigned the netblock "24.158.32.0" (i.e., router 110) some packets will be inaccurately routed to the malicious attacker 149. For example, Internet traffic addressed to computing device 103 sent by computing device 120 may be routed from router 115 to router 112 because the path length to router 112 would only be one hop as opposed to two hops to router 110 via intermediate router 113.

Some ISPs (e.g., ISPs 170-190) operating an AS (or other Internet connected networks) attempt to stop BGP attacks by deploying security measures. One example of a security measure that may be employed to stop BGP attacks includes using the Resource Public Key Infrastructure (RPKI). Resource Public Key Infrastructure (RPKI), also known as Resource Certification, is a specialized public key infrastructure (PKI) framework designed to secure the Internet's routing infrastructure. RPKI provides a way to connect Internet number resources (e.g., a netblock, ASNs, etc.) to a trust anchor. In cryptographic systems with hierarchical structure, a trust anchor is an authoritative entity for which trust is assumed and not derived.

The certificate structure of RPKI mirrors the way in which the IP addresses (or other Internet number resources) are distributed. That is, the IP addresses are initially distributed by the Internet Assigned Numbers Authority (IANA) to the regional Internet registries (RIRs) 160, which are the American Registry for Internet Numbers (ARIN), the Asia-Pacific Network Information Centre (APNIC), the African Network Information Center (AFRINIC), the Latin America and Caribbean Network Information Centre (LACNIC), and the Réseaux IP Européen Network Coordination Centre (RIPE NCC). The RIRs in turn distribute the IP addresses to local Internet registries (LIRs), who then distribute the IP addresses to their customers.

RPKI can be used by the legitimate holders of the block of IP addresses to control the operation of Internet routing protocols to prevent route hijacking and other attacks. In particular, RPKI is used to secure the BGP through BGP Route Origin Validation (ROV). Routers do not do any cryptographic operations to perform ROV. Rather, the signatures are checked by external software (e.g., relying-party software or an RPKI validator), which feeds the processed data to the router.

Using the RPKI system, the legitimate holder of a block of IP addresses (e.g., an ISP operating an AS) can use their resource certificate to make an authoritative, signed statement about which AS is authorized to originate their prefix in BGP. The statement is referred to as a signed Route Origin Authorization (ROA), which is validated by the ROV process noted above.

Figure 2:
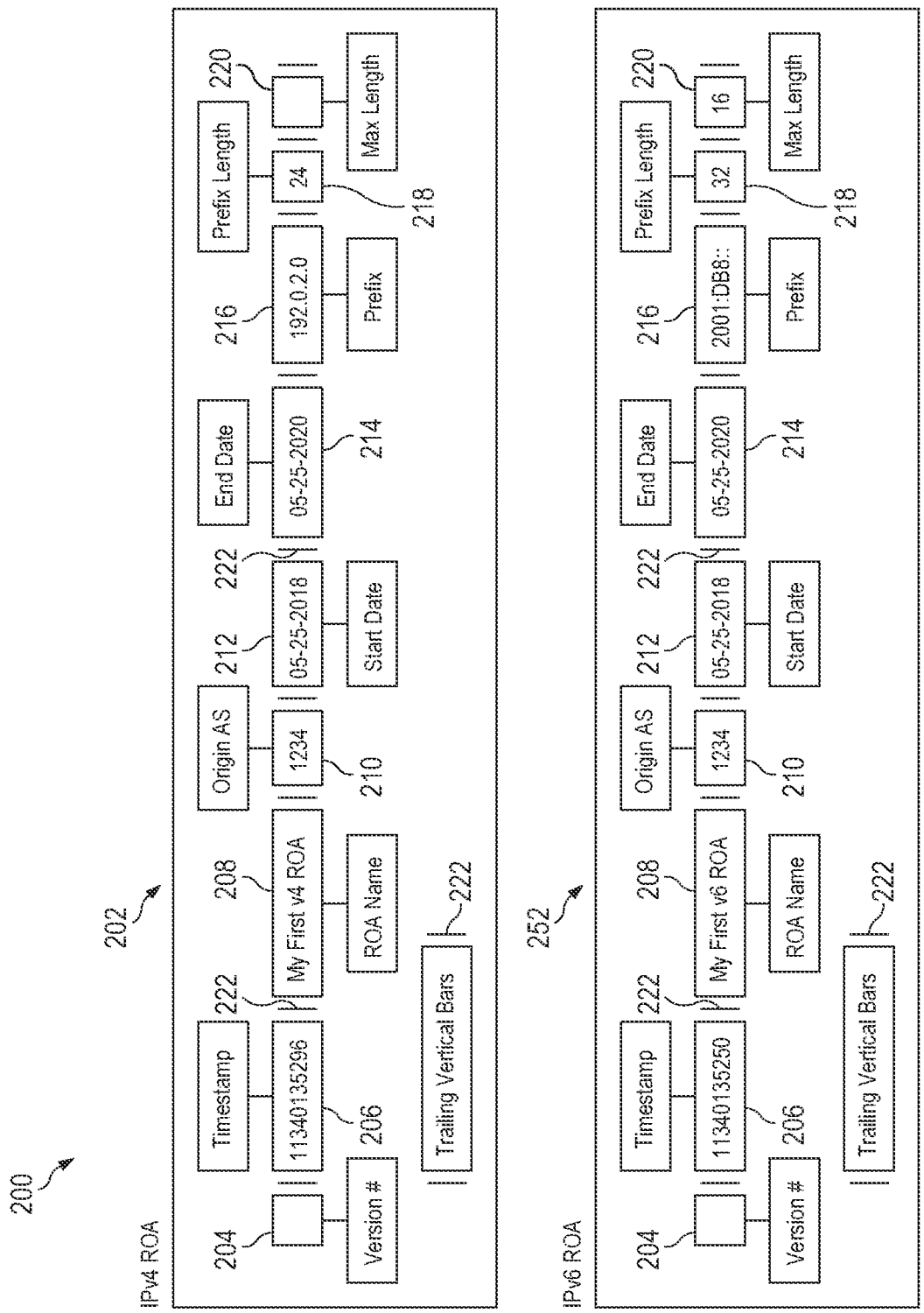
FIG. 2 is a representation of an IP version 4 (IPv4) ROA and an IP version 6 (IPv6) ROA.

FIG. 2 is a representation 200 of an IP version 4 (IPv4) ROA 202 and an IP version 6 (IPv6) ROA 252. The IPv4 ROA 202 and the IPv6 ROA 252 are each a cryptographically signed object that states which AS is authorized to originate a particular IP address prefix or set of prefixes. Such IPv4 and IPv6 ROAs 202, 252 may only be generated for Internet number resources covered by a resource certificate. The term ROA Request is used interchangeably with ROA on ARIN's site to mean a route origination authorization created for ARIN's RPKI repository. The IPv4 ROA 202 and the IPv6 ROA 252 in FIG. 2 may each be utilized within the IP network 100 of FIG. 1 to facilitate the routing of packets using the RPKI system.

As shown, the IPv4 ROA 202 and the IPv6 ROA 252 each include a version number field 204. In an embodiment, the value in the version number field 204 is set to one (1). However, in other embodiments the value may be set to zero (0). The IPv4 ROA 202 and the IPv6 ROA 252 each include a timestamp field 206. The timestamp field 206 includes a value that represents a time that the transaction corresponding to the ROA was generated. The value in the timestamp field 206 is specified in seconds since 1 Jan. 1970 (e.g., seconds since the epoch). The timestamp field 206 is included in the ROA 202, 252 to prevent, for example, replay attacks.

The IPv4 ROA 202 and the IPv6 ROA 252 each include an ROA name field 208. The ROA name field 208 may contain letters, numbers, spaces, and dash (-) characters used to generate a name, identifier, or other designation. Thus, the ROA name field 208 may be used for identification purposes. In an embodiment, the ROA name field 208 is limited to 256 characters. The name may be any name chosen by, for example, the ISP.

The IPv4 ROA 202 and the IPv6 ROA 252 each include an origin AS field 210. The origin AS field 210 includes a number or value. The number or value identifies the AS that is authorized to announce the IP prefixes specified by the ISP. In an embodiment, origin AS field 210 is limited to one AS per ROA 202, 252. Should the ISP intend to originate prefixes from more than one AS, the ISP would need to create a separate ROA for each AS.

The IPv4 ROA 202 and the IPv6 ROA 252 each include a start date field 212 and an end date field 214. The start date field 212 includes a value (e.g., a date) that represents the first date for which the ROA 202, 252 is considered valid. However, the value in the start date field 212 needs to be within the validity date range of the Certificate Authority (CA) certificate of issued to the ISP. The start date field 212 may be expressed in mm-dd-yyyy format (e.g., 1-1-2020 to represent Jan. 1, 2020). The end date field 214 includes a value (e.g., a date) that represents the last date for which the ROA 202, 252 should be considered valid. However, the value in the end date field 214 needs to be within the validity date range of the CA certificate. The end date field 214 may be expressed in mm-dd-yyyy format (e.g., 12-31-2020 to represent Dec. 31, 2020).

The IPv4 ROA 202 and the IPv6 ROA 252 each include a prefix field 216, a prefix length field 218, and a maximum length field 220. The prefix field 216 includes the IP address (e.g., 192.0.2.0) or range of IP addresses (e.g., 192.168.0.0-192.168.255.255) allocated to the ISP and certified by the ISP's CA certificate. The prefix length field 218 includes a value that specifies the size of the IP address range. For example, the value in prefix length field 218 may indicate that prefixes are 32 bits long (or some other length).

The prefix field 216 and the prefix length 218 may be collectively referred to as the route prefix. For example, the route prefix for the ROA 202 may be "192.0.2.0/24". Likewise, the route prefix for the ROA 252 may be "2001.DB8::/32".

The maximum length field 220 (a.k.a., the max length field) includes a value that identifies the smallest exact prefix length announcement allowed for a particular route. For example, the value in maximum length field 220 may indicate that the smallest acceptable prefix length is 16 bits long (or some other length). The maximum length field 220 is optional. When the maximum length field 220 is not provided, then only the exact prefix entered will be specified in the ROA 202, 252.

More than one prefix may be included within the ROA 202, 252 at a time. In such cases, the ISP needs to provide a values prefix, prefix Length, and max length values for each of these fields. In some cases, one or more of the fields may be left blank.

As shown in FIG. 2, the version number 204, the timestamp 206, the ROA name field 208, the origin AS 210, the start date field 212, the end date field 214, the prefix field 216, the prefix length field 218, and the maximum length field 220 are each followed by a trailing vertical bar (e.g., |) 222. That is, one of the trailing vertical bars 222 follows each of the fields in the ROA 202, 252 to separate or delimit the different fields from each other.

While the IPv4 ROA 202 and the IPv6 ROA 252 may be suitable for facilitate the routing of packets using the RPKI system, they have drawbacks. For example, the IPv4 ROA 202 and the IPv6 ROA 252 may still be susceptible to being manipulated or compromised by a malicious attacker (e.g., the malicious attacker 149) implementing a BGP attack. Therefore, additional safeguards designed to enhance the security of the IPv4 ROA 202 and the IPv6 ROA 252 are desirable.

Disclosed herein are techniques that enhance an ROA by adding a blockchain hash. Because of the blockchain hash, the security or integrity of the ROA is improved relative to current ROAs being used in the RPKI system. As such, a malicious attacker is prevented from implementing a successful BGP attack and unable to improperly divert packet traffic in an IP network. Thus, routing devices implementing the blockchain enhanced route authorization disclosed herein are able to offer enhanced security for the data and information being routed through a telecommunication network relative to current routing devices only utilizing known ROA techniques.

Figure 3:
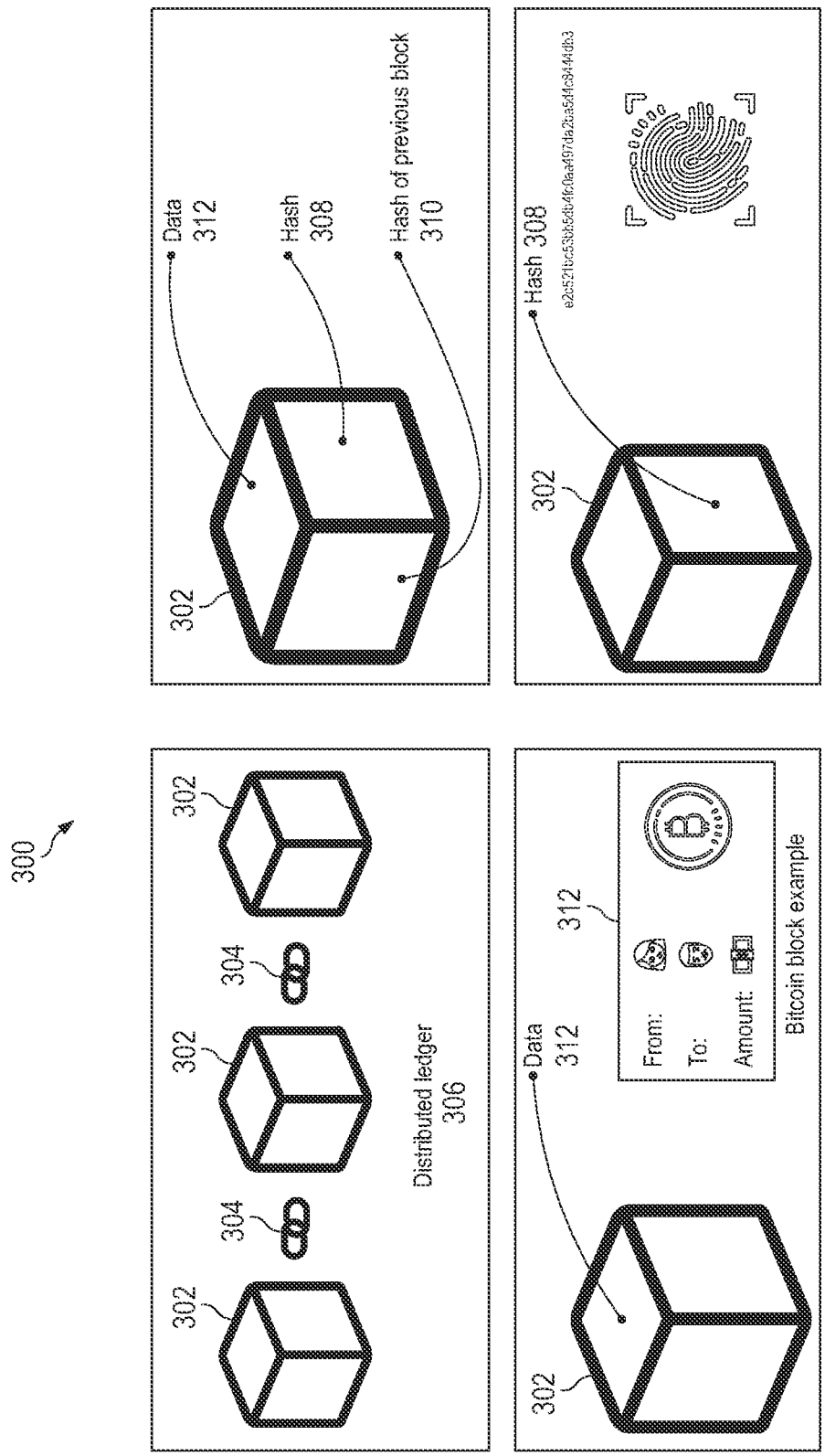
FIG. 3 is a representation of a distributed ledger process.

FIG. 3 is a representation of a distributed ledger process 300. One example of the distributed ledger process is known as blockchain. Blockchain is a growing list of records, called blocks 302, that are linked 304 using cryptography to form a distributed ledger 306. By design, blockchain is resistant to modification of its data. This is because once recorded, the data in any given block 302 cannot be altered retroactively without alteration of all subsequent blocks 302. For use as a distributed ledger 306, a blockchain is typically managed by a peer-to-peer network collectively adhering to a protocol for inter-node communication and validating new blocks. Although blockchain records are not unalterable, blockchains may be considered secure by design and exemplify a distributed computing system with high fault tolerance. Therefore, blockchain provides an open, distributed ledger that can record transactions between two parties efficiently and in a verifiable and permanent way.

As shown in FIG. 3, each block 302 contains a cryptographic hash 308 of the block 302, a cryptographic hash 310 of the previous block 302, and data 312 representing a transaction record. While not shown in FIG. 3, each block 302 also includes a timestamp and may include other information used to implement the blockchain concept.

The cryptographic hash 308, which may be referred to herein as the hash or the blockchain hash, is generated using, for example, the Secure Hash Algorithm 256 (SHA-256), the SHA-512, and so on. The results of the blockchain hash may be a series of letters and numbers that represent the "fingerprint" of the block 302.

The data 312 identifies the parties to the transaction (e.g., the "From" and the "To") as well as the amount of the transaction. While a single transaction is depicted in FIG. 3, the data 312 may contain numerous valid transactions. In practical applications, the data 312 may include other information used to facilitate a blockchain process.

Keeping the above in mind, the blocks 302 hold batches of valid transactions that are hashed and encoded into a Merkle tree. In cryptography and computer science, a Merkle tree (a.k.a., a hash tree) is a tree in which every leaf node is labeled with the cryptographic hash of a data block, and every non-leaf node is labeled with the cryptographic hash of the labels of its child nodes. Hash trees allow efficient and secure verification of the contents of large data structures.

As shown by the representation 300 in FIG. 3, each block 302 includes the cryptographic hash 308 of the prior block 302 in the blockchain, linking the two. The linked blocks 302 form a chain. This iterative process confirms the integrity of the previous block 302, all the way back to the initial block 302, which is known as the genesis block.

Figure 4:
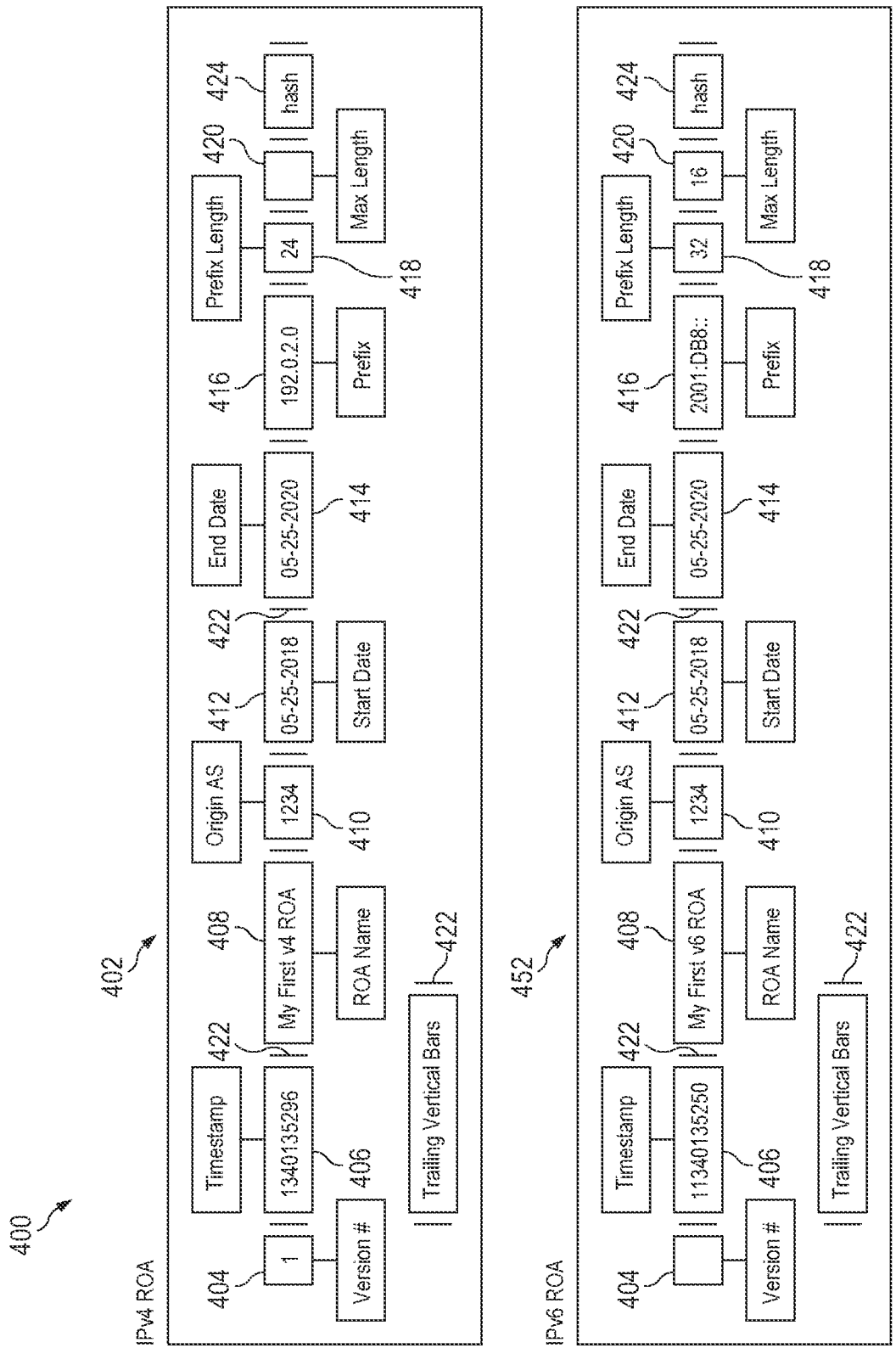
FIG. 4 is a representation of an IPv4 ROA and an IPv6 ROA according to an embodiment of the disclosure.

FIG. 4 is a representation 400 of an IP version 4 (IPv4) ROA 402 and an IP version 6 (IPv6) ROA 452 according to an embodiment of the disclosure. The IPv4 ROA 402 and the IPv6 ROA 452 are each a cryptographically signed object that states which AS is authorized to originate a particular IP address prefix or set of prefixes. Such IPv4 and IPv6 ROAs 402, 452 may only be generated for Internet number resources covered by a resource certificate. The IPv4 ROA 402 and the IPv6 ROA 452 in FIG. 4 may each be utilized within the IP network 100 of FIG. 1 to facilitate the routing of packets using the RPKI system.

As shown, the IPv4 ROA 402 and the IPv6 ROA 452 each include a version number field 404. In an embodiment, the value in the version number field 404 is set to one (1). However, in other embodiments the value may be set to zero (0). The IPv4 ROA 402 and the IPv6 ROA 452 each include a timestamp field 406. The timestamp field 406 includes a value that represents a time that the transaction corresponding to the ROA was generated. The value in the timestamp field 406 is specified in seconds since 1 Jan. 1970 (e.g., seconds since the epoch). The timestamp field 406 is included in the ROA 402, 452 to prevent, for example, replay attacks.

The IPv4 ROA 402 and the IPv6 ROA 452 each include an ROA name field 408. The ROA name field 408 may contain letters, numbers, spaces, and dash (-) characters used to generate a name, identifier, or other designation. Thus, the ROA name field 408 may be used for identification purposes. In an embodiment, the ROA name field 408 is limited to 256 characters. The name may be any name chosen by, for example, the ISP.

The IPv4 ROA 402 and the IPv6 ROA 452 each include an origin AS field 410. The origin AS field 410 includes a number or value. The number or value identifies the AS that is authorized to announce the IP prefixes specified by the ISP. In an embodiment, origin AS field 410 is limited to one AS per ROA 402, 452. Should the ISP intend to originate prefixes from more than one AS, the ISP would need to create a separate ROA for each AS.

The IPv4 ROA 402 and the IPv6 ROA 452 each include a start date field 412 and an end date field 414. The start date field 412 includes a value (e.g., a date) that represents the first date for which the ROA 402, 452 is considered valid. However, the value in the start date field 412 needs to be within the validity date range of the CA certificate issued to the ISP. The start date field 412 may be expressed in mm-dd-yyyy format (e.g., 1-1-2020 to represent Jan. 1, 2020). The end date field 414 includes a value (e.g., a date) that represents the last date for which the ROA 402, 452 should be considered valid. However, the value in the end date field 414 needs to be within the validity date range of the CA certificate. The end date field 414 may be expressed in mm-dd-yyyy format (e.g., 12-31-2020 to represent Dec. 31, 2020).

The IPv4 ROA 402 and the IPv6 ROA 452 each include a prefix field 416, a prefix length field 418, and a maximum length field 420. The prefix field 416 includes the IP address (e.g., 192.0.2.0) or range of IP addresses (e.g., 192.168.0.0-192.168.255.255) allocated to the ISP and certified by the ISP's CA certificate. The prefix length field 418 includes a value that specifies the size of the IP address range. For example, the value in prefix length field 418 may indicate that prefixes are 32 bits long (or some other length).

The prefix field 416 and the prefix length 418 may be collectively referred to as the route prefix. For example, the route prefix for the ROA 402 may be "192.0.2.0/24". Likewise, the route prefix for the ROA 452 may be "2001.DB8::/32".

The maximum length field 420 (a.k.a., the max length field) includes a value that identifies the smallest exact prefix length announcement allowed for a particular route. For example, the value in maximum length field 418 may indicate that the smallest acceptable prefix length is 16 bits long (or some other length). The maximum length field 420 is optional. When the maximum length field 420 is not provided, then only the exact prefix entered will be specified in the ROA 402, 452.

More than one prefix may be included within the ROA 402, 452 at a time. In such cases, the ISP needs to provide a values prefix, prefix Length, and max length values for each of these fields. In some cases, one or more of the fields may be left blank.

Unlike the IPv4 ROA 202 and the IPv6 ROA 252 of FIG. 2, the IPv4 ROA 402 and the IPv6 ROA 452 of FIG. 4 include a hash field 424 containing a blockchain hash. Because of the blockchain hash, the IPv4 ROA 402 and the IPv6 ROA 452 are able to take advantage of the benefits of a distributed ledger process, such as the blockchain process of FIG. 3. Indeed, each ROA 402, 452 is effectively "chained" to a previous ROA so that a malicious attacker is unable to alter the ROA and maliciously or surreptitiously divert packet traffic. Thus, the overall RPKI system is improved and provides an additional measure of security.

As shown in FIG. 4, the version number field 404, the timestamp field 406, the ROA name field 408, the origin AS 410, the start date 412, the end date 414, the prefix field 416, the prefix length field 418, the maximum length field 420, and the hash field 424 are each followed by a trailing vertical bar (e.g., |) 422. That is, one of the trailing vertical bars 422 follows each of the fields in the ROA 402, 452 to separate or delimit the different fields from each other.

While depicted as immediately following the maximum length field 420 in FIG. 4, the hash field 424 may be otherwise located within the ROA 402, 452 in practical applications. For example, the hash field 424 may immediately follow the timestamp field 406, may be disposed between the end date field 414 and the prefix field 416, and so on. The hash field 424 has a length (in bits) sufficient to accommodate, for example, a hash produced using SHA-256, SHA-512, and so on.

Figure 5:
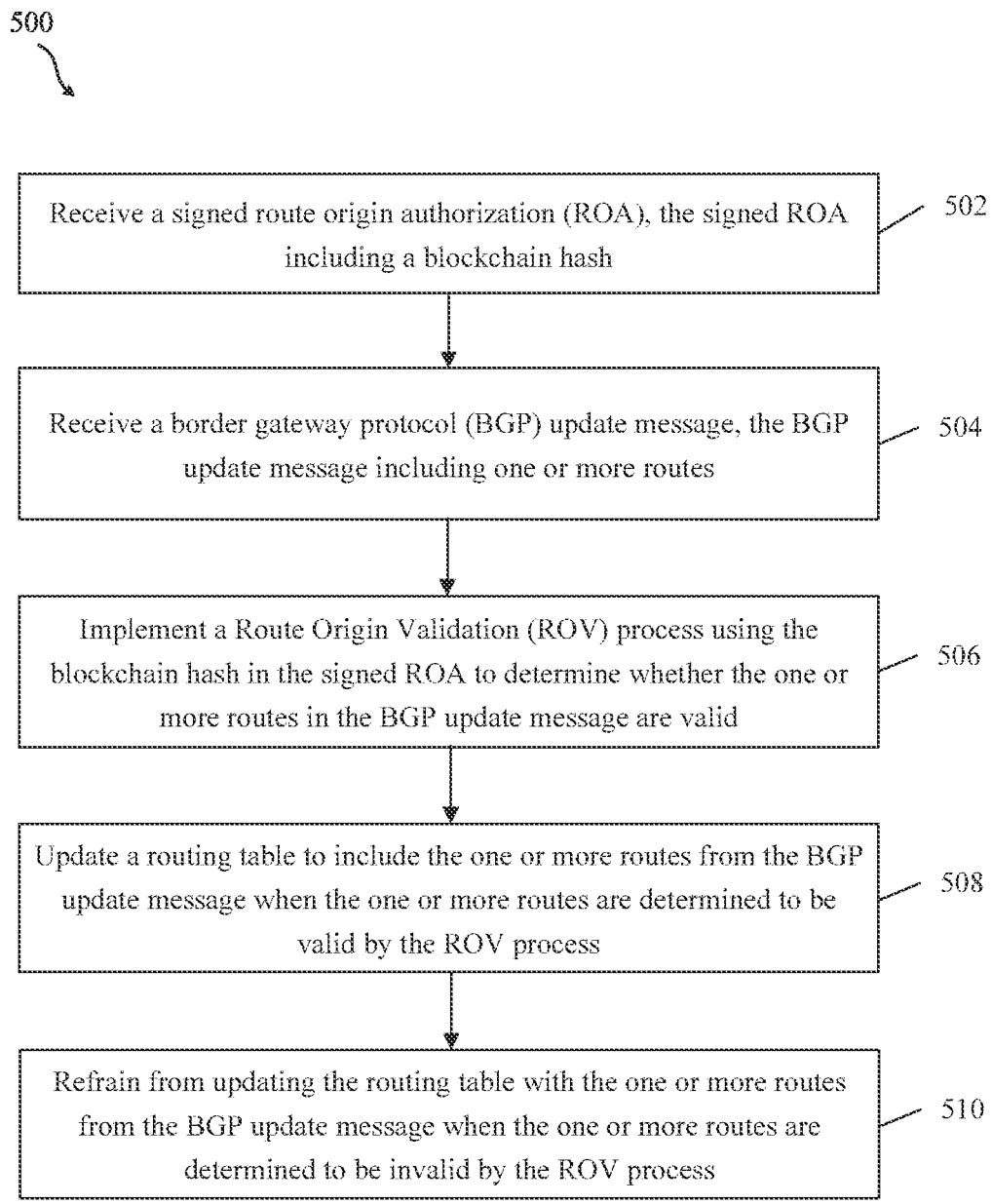
FIG. 5 is a method of validating routing tables implemented by a routing device.

FIG. 5 is a method 500 of validating routing tables implemented by a routing device (e.g., router 110). The method 500 may be performed when routing tables are to be validated via an RPKI system or process. The method 500 may be performed to prevent a malicious attacker from implementing a successful BGP attack allowing packet traffic in an IP network to be improperly diverted. Thus, routing devices are able to offer enhanced security for the data and information being routed through a telecommunication network relative to current routing devices only utilizing known ROA techniques.

In block 502, the routing device receives a signed ROA including a blockchain hash. In an embodiment, the blockchain hash is disposed in a blockchain hash field (e.g., hash field 424) of the signed ROA (e.g., the ROA 402, 452). In an embodiment, the blockchain hash includes a route prefix (e.g., "24.158.32.0/19") record. In an embodiment, the routing device receives the signed ROA from a server of the ISP (e.g., a server of the first ISP 180).

In block 504, the routing device receives a BGP update message including one or more routes. In an embodiment, the routing device (e.g., router 110) receives the BGP update message from another router (e.g., router 111, router 112, router 113, or router 115).

In block 506, the routing device implements an ROV process using the blockchain hash in the signed ROA to determine whether the one or more routes in the BGP update message are valid. In an embodiment, the routing device implements the ROV process using Resource Public Key Infrastructure (RPKI) software stored in a memory of the routing device. For example, an RPKI validator program or application may have been installed on the routing device. The RPKI software or validator is configured to provide an indication of whether the one or more routes in the BGP update message are valid or not.

In block 508, the routing device updates a routing table to include the one or more routes from the BGP update message when the one or more routes are determined to be valid by the ROV process. For example, the routing device may store the updated routing tables in memory.

In block 510, the routing device refrains from updating the routing table with the one or more routes from the BGP update message when the one or more routes are determined to be invalid by the ROV process. In an embodiment, the routing device discards the BGP update message when the one or more routes have been determined to be invalid. That is, the BGP message is dropped and the routing tables in the memory of the routing device are not updated.

In an embodiment, the routing device (e.g., router 110) receives a packet from a second routing device (e.g., router 111) and routes that packet to a third routing device (e.g., router 113, router 115, etc.) according to the routing table, which may or may not have been updated depending on the result of the PPKI validation process.

Figure 6:
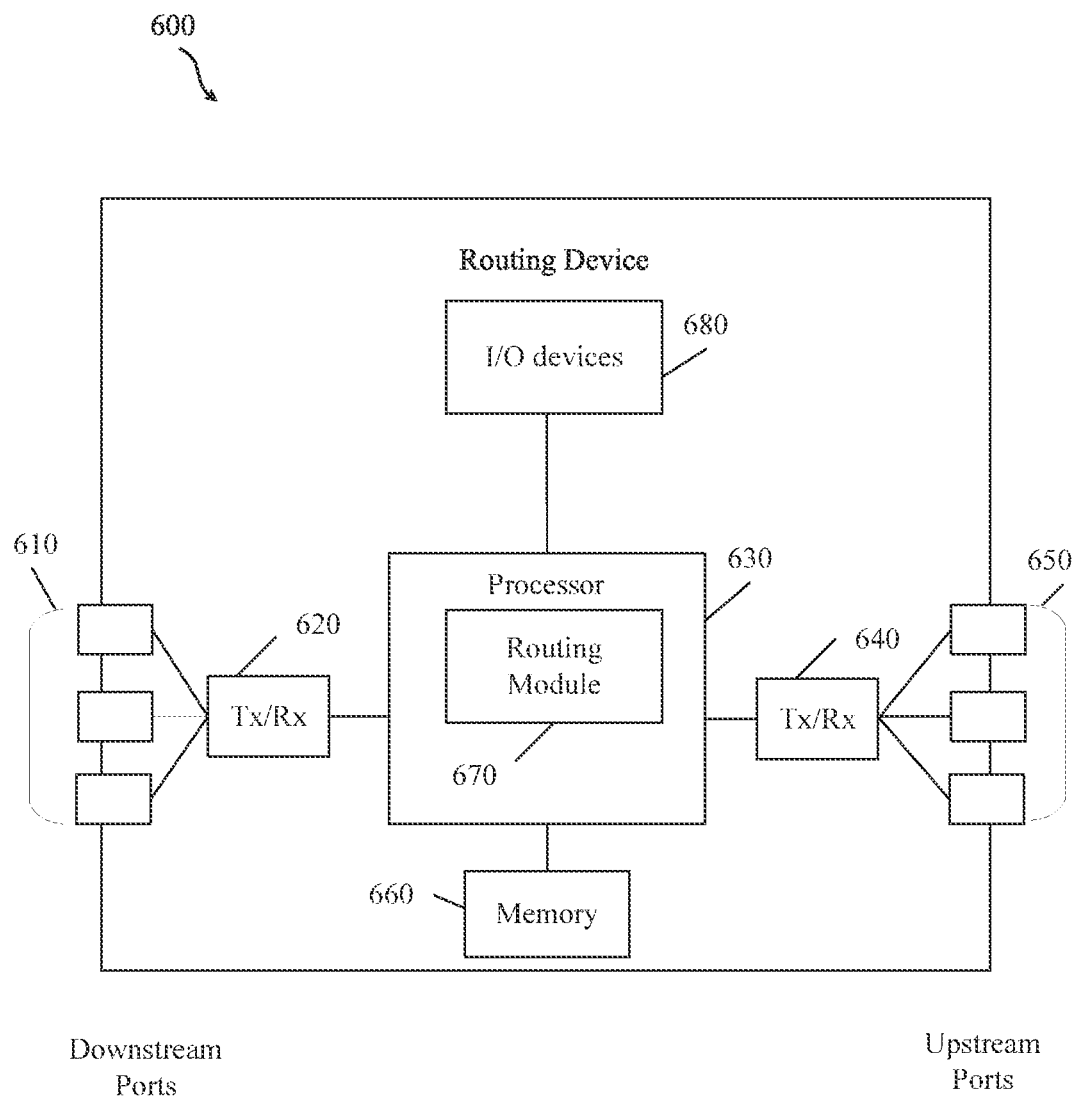
FIG. 6 is a schematic diagram of a routing device.

FIG. 6 is a schematic diagram of a routing device 600 (or a computing device) according to an embodiment of the disclosure. The routing device 600 is suitable for implementing the disclosed embodiments as described herein. The routing device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The routing device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

The processor 630 is implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 is in communication with the ingress ports 610, receiver units 620, transmitter units 640, egress ports 650, and memory 660. The processor 630 comprises a routing module 670. The routing module 670 is able to implement one or more of the embodiments or actions described above. For instance, the routing module 670 implements, processes, prepares, or provides the various functions disclosed herein. The inclusion of the routing module 670 therefore provides a substantial improvement to the functionality of the routing device 600 and effects a transformation of the routing device 600 to a different state. Alternatively, the routing module 670 is implemented as instructions stored in the memory 660 and executed by the processor 630.

The routing device 600 may also include input and/or output (I/O) devices 680 for communicating data to and from a user. The I/O devices 680 may include output devices such as a display for displaying video data, speakers for outputting audio data, etc. The I/O devices 680 may also include input devices, such as a keyboard, mouse, trackball, etc., and/or corresponding interfaces for interacting with such output devices.

The memory 660 comprises one or more disks, tape drives, and solid-state drives and may be used as an overflow data storage device, to store programs when such programs are selected for execution, and to store instructions and data that are read during program execution. The memory 660 may be volatile and/or non-volatile and may be read-only memory (ROM), random access memory (RAM), ternary content-addressable memory (TCAM), and/or static random-access memory (SRAM).

Figure 7:
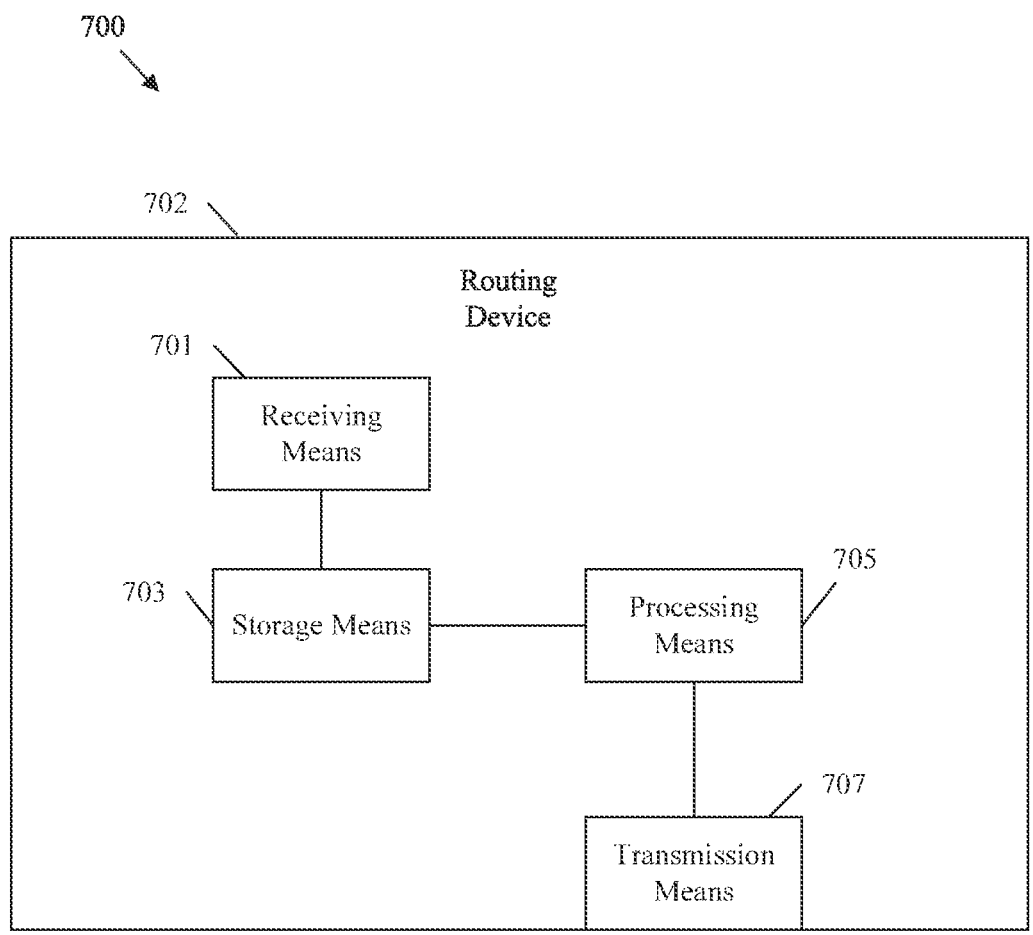
FIG. 7 is a schematic diagram of a means for routing.

FIG. 7 is a schematic diagram of an embodiment of a means for routing 700. In an embodiment, the means for routing 700 is implemented in a routing device 702 (e.g., routing device 600, router 110, etc.). The routing device 702 includes receiving means 701. The receiving means 701 is configured to receive a packet, a BGP update message, a signed ROA, and so on. The routing device 702 includes transmission means 707 coupled to the receiving means 701. The transmission means 707 is configured to transmit a packet, a BGP update message, a validation request, and so on.

The routing device 702 includes a storage means 703. The storage means 703 is coupled to at least one of the receiving means 701 or the transmission means 707. The storage means 703 is configured to store instructions, code, or software. The routing device 702 also includes processing means 705. The processing means 705 is coupled to the storage means 703. The processing means 705 is configured to execute the instructions stored in the storage means 703 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A routing device, comprising:
a memory storing instructions; and
one or more processors coupled to the memory, the one or more processors configured to execute the instructions to cause the routing device to:
receive a signed route origin authorization (ROA), the signed ROA including a blockchain hash;
receive a border gateway protocol (BGP) update message, the BGP update message including one or more routes;
implement a Route Origin Validation (ROV) process using the blockchain hash in the signed ROA to determine whether the one or more routes in the BGP update message are valid;
update a routing table to include the one or more routes from the BGP update message when the one or more routes are determined to be valid by the ROV process; and
refrain from updating the routing table with the one or more routes from the BGP update message when the one or more routes are determined to be invalid by the ROV process,
wherein the ROV process is implemented using Resource Public Key Infrastructure (RPKI) software stored in the memory of the routing device.

2. The routing device of claim 1, wherein the blockchain hash is disposed in a blockchain field of the signed ROA.

3. The routing device of claim 1, wherein the blockchain hash includes a route prefix record.

4. The routing device of claim 1, wherein the signed ROA is received from a server of an Internet Service Provider (ISP).

5. The routing device of claim 1, wherein the BGP update message is received from another routing device.

6. The routing device of claim 1, wherein the signed ROA received by the routing device was generated by a regional Internet registry (RIR).

7. The routing device of claim 1, wherein the routing device further comprises a transmitter configured to route a packet according to the routing table.

8. A method of validating routing tables implemented by a routing device, comprising:
receiving a signed route origin authorization (ROA), the signed ROA including a blockchain hash;
receiving a border gateway protocol (BGP) update message, the BGP update message including one or more routes;
implementing a Route Origin Validation (ROV) process using the blockchain hash in the signed ROA to determine whether the one or more routes in the BGP update message are valid;
updating a routing table to include the one or more routes from the BGP update message when the one or more routes are determined to be valid by the ROV process; and
refrain from updating the routing table with the one or more routes from the BGP update message when the one or more routes are determined to be invalid by the ROV process,
wherein the ROV process is implemented using Resource Public Key Infrastructure (RPKI) software stored in a memory of the routing device.

9. The method of claim 8, wherein the blockchain hash is disposed in a blockchain field of the signed ROA.

10. The method of claim 8, wherein the blockchain hash includes a route prefix record.

11. The method of claim 8, further comprising receiving the signed ROA from a server of an Internet Service Provider (ISP).

12. The method of claim 8, further comprising receiving the BGP update message from another routing device.

13. The method of claim 8, further comprising receiving a packet from a second routing device and routing the packet to a third routing device according to the routing table.

14. A computer program product comprising instructions stored on a non-transitory computer-readable medium that, when executed by one or more processors, cause a routing device to:
implement a Route Origin Validation (ROV) process using a blockchain hash obtained from a signed route origin authorization (ROA) to determine whether one or more routes in a border gateway protocol (BGP) update message are valid;
update a routing table to include the one or more routes from the BGP update message when the one or more routes are determined to be valid by the ROV process; and
refrain from updating the routing table with the one or more routes from the BGP update message when the one or more routes are determined to be invalid by the ROV process,
wherein the ROV process is implemented using Resource Public Key Infrastructure (RPKI) software stored on the non-transitory computer-readable medium.

15. The computer program product of claim 14, wherein the ROV process is implemented in response to receiving the signed ROA including the blockchain hash, and receiving the BGP update message including one or more routes.

16. The computer program product of claim 14, wherein the signed ROA is received from a server of an Internet Service Provider (ISP).

17. The computer program product of claim 14, wherein the BGP update message is received from another routing device.

18. The method of claim 8, wherein the signed ROA received by the routing device was generated by a regional Internet registry (RIR).

19. The computer program product of claim 14, wherein the blockchain hash is disposed in a blockchain field of the signed ROA.

20. The computer program product of claim 14, the instructions when executed by the one or more processors, cause the routing device to further receive a packet from a second routing device and route the packet to a third routing device according to the routing table.

* * * * *